(12) United States Patent
Luoma et al.

(10) Patent No.: US 8,799,254 B2
(45) Date of Patent: Aug. 5, 2014

(54) METHOD AND APPARATUS FOR IMPROVED SEARCHING OF DATABASE CONTENT

(75) Inventors: Kristian Luoma, Kiviniemi (FI); Jussi-Pekka Partanen, Helsinki (FI)

(73) Assignee: Nokia Corporation, Espoo (FI)

( * ) Notice: Subject to any disclaimer, the term of this patent is extended or adjusted under 35 U.S.C. 154(b) by 880 days.

(21) Appl. No.: 12/597,649

(22) PCT Filed: Jun. 20, 2007

(86) PCT No.: PCT/IB2007/001873
§ 371 (c)(1),
(2), (4) Date: Jan. 19, 2010

(87) PCT Pub. No.: WO2008/132535
PCT Pub. Date: Nov. 6, 2008

(65) Prior Publication Data
US 2010/0138445 A1 Jun. 3, 2010

Related U.S. Application Data

(60) Provisional application No. 60/914,099, filed on Apr. 26, 2007.

(51) Int. Cl.
*G06F 17/30* (2006.01)
(52) U.S. Cl.
USPC .......................................... 707/706; 707/770
(58) Field of Classification Search
USPC ................................. 707/770, 706
See application file for complete search history.

(56) References Cited

U.S. PATENT DOCUMENTS

| | | | |
|---|---|---|---|
| 7,027,848 B2 | 4/2006 | Robinson et al. | |
| 8,375,026 B1 * | 2/2013 | Elliott et al. | 707/728 |
| 8,429,220 B2 * | 4/2013 | Wilkinson et al. | 709/202 |
| 8,548,995 B1 * | 10/2013 | Curtiss | 707/731 |
| 2002/0078013 A1 * | 6/2002 | Josenhans | 707/1 |
| 2007/0027848 A1 | 2/2007 | Howard et al. | |

(Continued)

FOREIGN PATENT DOCUMENTS

| | | |
|---|---|---|
| EP | 1 058 443 A1 | 12/2000 |
| GB | 2 369 214 A | 5/2002 |
| WO | WO 2006/079074 A2 | 7/2006 |

OTHER PUBLICATIONS

The International Search Report for PCT Application No. PCT/IB2007/001873; Filed Jun. 20, 2007; Date of Completion Dec. 18, 2007; Date of Mailing Jan. 2, 2008.

(Continued)

*Primary Examiner* — Noosha Arjomandi
(74) *Attorney, Agent, or Firm* — Alston & Bird LLP

(57) ABSTRACT

It is presented a method for a portable apparatus comprising: receiving text input as search text from a user of the portable apparatus; searching for content items of at least one content type matching the search text, resulting in a list of containing zero or more matching content items; presenting the list of matching content items on a display of the portable apparatus, when the list of matching content items contains at least a threshold number of content items; and presenting at least one option to search a database available over a digital network using the search text on the display, when the list of matching content items comprises less than the threshold number of content items. Corresponding portable apparatuses, a computer program product and a user interface are also presented.

18 Claims, 4 Drawing Sheets

(56) References Cited

U.S. PATENT DOCUMENTS

| | | |
|---|---|---|
| 2007/0032267 A1* | 2/2007 | Haitani et al. ............ 455/556.2 |
| 2007/0047697 A1* | 3/2007 | Drewry et al. ............ 379/88.13 |
| 2008/0208812 A1* | 8/2008 | Quoc et al. ........................ 707/3 |
| 2008/0215552 A1* | 9/2008 | Safoutin ........................... 707/3 |
| 2009/0024614 A1* | 1/2009 | Pousti et al. ...................... 707/5 |
| 2009/0234853 A1* | 9/2009 | Gupta et al. ...................... 707/6 |

OTHER PUBLICATIONS

The Written Opinion for PCT Application No. PCT//IB2007/001873; Filed Jun. 20, 2007; Date of Completion Dec. 18, 2007; Date of Mailing Jan. 2, 2008.

International Preliminary Report on Patentability for Application No. PCT/IB2007/001873 dated Oct. 27, 2009.

Extended European Search Report for European Application No. 12 15 5512 dated Apr. 4, 2012.

Office Action for European Application No. 12 15 5512 dated Feb. 2, 2013.

Office Action for European Application No. 12 15 5512 dated Feb. 15, 2013.

Office Action for European Application No. 07 734 946 dated Mar. 4, 2010.

Office Action for European Application No. 07 734 946 dated Apr. 26, 2011.

Office Action for Chinese Application No. 200780053251.4 dated Feb. 3, 2012.

Office Action for Chinese Application No. 200780053251.4 dated Oct. 19, 2012.

Office Action for Chinese Application No. 200780053251.4 dated Jun. 26, 2013.

* cited by examiner

METHOD AND APPARATUS FOR IMPROVED SEARCHING OF DATABASE CONTENT

This application is a National Phase entry of PCT/IB07/01873 filed Jun. 20, 2007, which claims benefit of Provisional Application No. 60/914,099 filed Apr. 26, 2007, the disclosure of which is incorporated herein by reference in its entirety.

FIELD OF THE INVENTION

The present invention generally relates to portable apparatuses and more particularly to providing statuses of portable apparatus.

BACKGROUND OF THE INVENTION

Mobile terminals, or mobile (cellular) telephones, for mobile telecommunications systems like GSM, UMTS, D-AMPS and CDMA2000 have been used for many years now. In the older days, mobile terminals were used almost exclusively for voice communication with other mobile terminals or stationary telephones. Gradually, the use of modern terminals has been broadened to include not just voice communication, but also various other services and applications such as www/wap browsing, video telephony, electronic messaging (e.g. SMS, MMS, email, instant messaging), digital image or video recording, FM radio, music playback, electronic games, calendar/organizer/time planner, word processing, etc.

With the ability to handle different content types, such as images, pictures, music, etc., the user needs to be able to find content items of these content types.

A known way to solve this is to provide a file browser where the user can navigate to a desired content item. However, finding the desired content item can take a significant amount of time and effort.

Consequently, there is a need to provide an improved way to find content items in a mobile terminal.

SUMMARY

In view of the above, an objective of the invention is to solve or at least reduce the problems discussed above.

Generally, the above objectives are achieved by the attached independent patent claims.

According to a first aspect of the present invention there has been provided a method for a portable apparatus comprising: receiving text input as search text from a user of the portable apparatus; searching for content items of at least one content type matching the search text, resulting in a list of containing zero or more matching content items; presenting the list of matching content items on a display of the portable apparatus, when the list of matching content items contains at least a threshold number of content items; and presenting at least one option to search a database available over a digital network using the search text on the display, when the list of matching content items comprises less than the threshold number of content items. According to this aspect, it is enabled to easily search for content items and to access online services to broaden the search field if there are not sufficient matches. It is to be noted that a network connection does not need to be established for the options to search databases to be presented. Only when search criteria are sent to the search database does a network connection need to be present.

In the searching, the searching for content items may be performed using an index of content items, the index being stored in the portable apparatus. The index speeds up searching, improving performance during search.

The threshold number may be one. In other words, in this situation the options to search a database are only presented when the list of matching items is empty.

The receiving text input, searching for content items, presenting the list and presenting at least one option to search a database may be repeated until either an item of the list of matching content items is selected or an option of the at least one option is selected.

The searching for content items may involve searching for content items matching the search text from content items associated with the portable apparatus. In other words, this includes searching content items available in the portable apparatus and available through a local connection to the portable apparatus.

The at least one content type may comprise at least one content type selected from the group comprising of images, songs, contacts, messages, chat histories, documents, visited web sites and bookmarks.

The searching for content items may involve searching for content items matching the search text from content items associated with the user.

At least some of the content items associated with the user may be stored on a remote server, available to the portable apparatus over a digital network. This allows the user to easily search his/her content items even if they are stored on a remote server.

At least some of the content items associated with the user may be stored locally in the portable apparatus.

The method may further comprise: when the user selects one of the at least one option, providing location information of the portable apparatus as search criteria to a database associated with the selected option. This enables the user to search for matches in a vicinity of the user.

The location information may be supplied by a receiver for a global positioning system.

The presenting at least one option may involve presenting at least one option to search a database, the option to search a database being selected from the group comprising an option to search a business directory, an option to search a person directory, an option to search the world wide web and an option to search a movie database.

A second aspect of the present invention is a portable apparatus comprising: a display; user input receiver; a controller; wherein: the controller is adapted to receive text input using the user input receiver as search text from a user of the portable apparatus; the controller is adapted to search for content items of at least one content type matching the search text, resulting in a list of containing zero or more matching content items; the controller is adapter to present the list of matching content items on the display of the portable apparatus, when the list of matching content items contains at least a threshold number of content items; and presenting at least one option to search a database available over a digital network using the search text on the display, when the list of matching content items comprises less than the threshold number of content items.

A third aspect of the present invention is a portable apparatus comprising: means for receiving text input as search text from a user of the portable apparatus; means for searching for content items of at least one content type matching the search text, resulting in a list of containing zero or more matching content items; means for presenting the list of matching content items on a display of the portable apparatus, when the list of matching content items contains at least a threshold number of content items; and means for presenting at least one option to search a database available over a digital network using the search text on the display, when the list of matching content items comprises less than the threshold number of content items.

A fourth aspect of the present invention is a computer program product comprising software instructions that, when executed in a portable apparatus, performs the method according to the first aspect.

A fifth aspect of the present invention is a user interface comprising: a display, and a user input receiver, wherein the user interface is arranged to: receive text input as search text from a user of the portable apparatus; present a list of matching content items matching the search text on said display of the portable apparatus, when the list of matching content items contains at least a threshold number of content items; and present at least one option to search a database available over a digital network using the search text on the display, when the list of matching content items comprises less than the threshold number of content items.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which.

DETAILED DESCRIPTION OF EMBODIMENTS

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
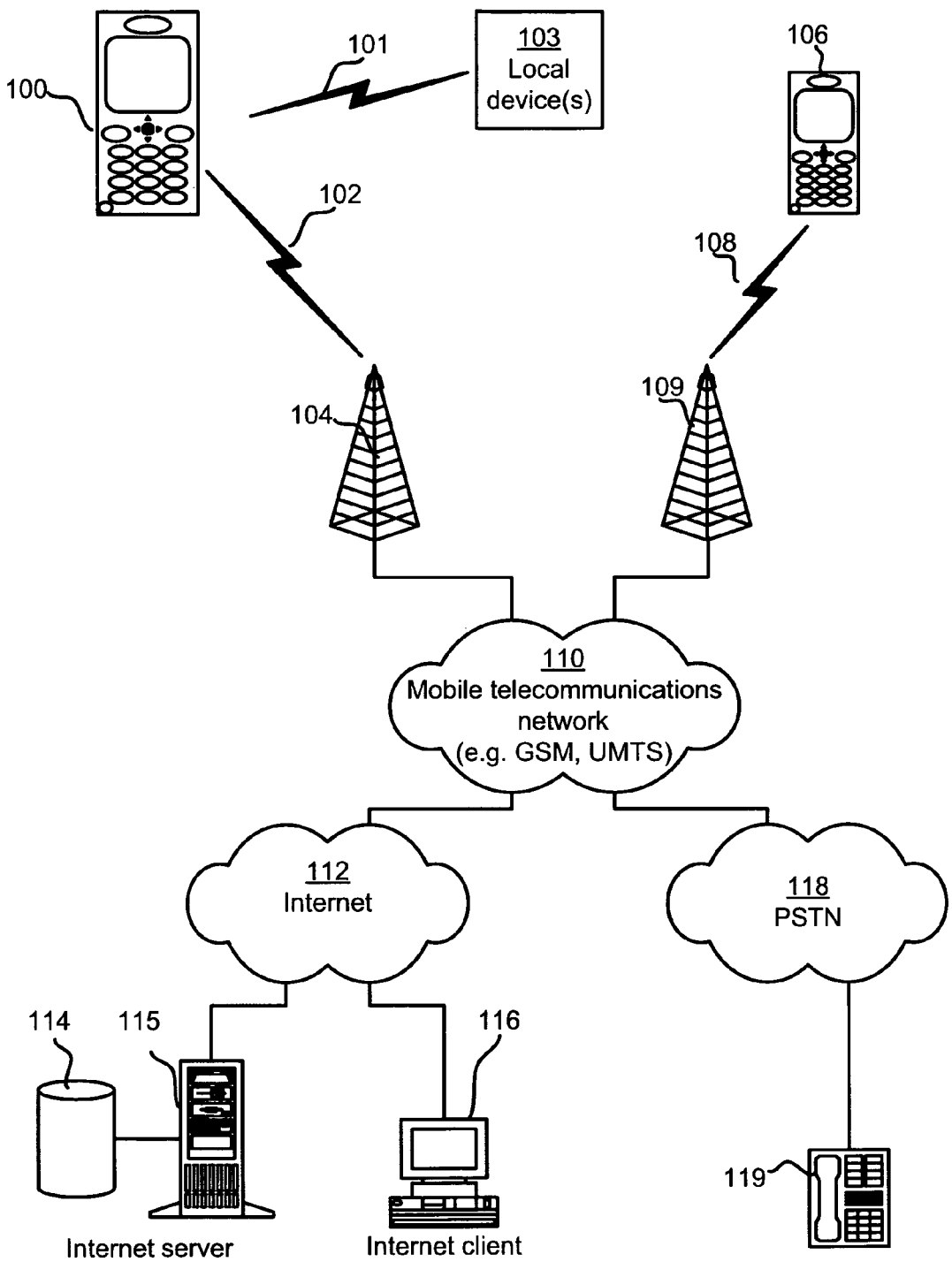
FIG. 1 is a schematic illustration of a cellular telecommunication system, as an example of an environment in which the present invention may be applied.

FIG. 1 illustrates an example of a cellular telecommunications system in which the invention may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the present invention and other devices, such as another mobile terminal 106 or a stationary telephone 119. It is to be noted that for different embodiments of the mobile terminal 100 and in different situations, different ones of the telecommunications services referred to above may or may not be available; the invention is not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 112, which may be Internet or a part thereof. An Internet server 115 has a data storage 114 and is connected to the wide area network 112, as is an Internet client computer 116. The server 115 may host a www/wap server capable of serving www/wap content to the mobile terminal 100.

A public switched telephone network (PSTN) 118 is connected to the mobile telecommunications network 110 in a familiar manner. Various telephone terminals, including the stationary telephone 119, are connected to the PSTN 118.

The mobile terminal 100 is also capable of communicating locally via a local link 101 to one or more local devices 103, such as a global positioning system (GPS) receiver. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, etc.

Figure 2:
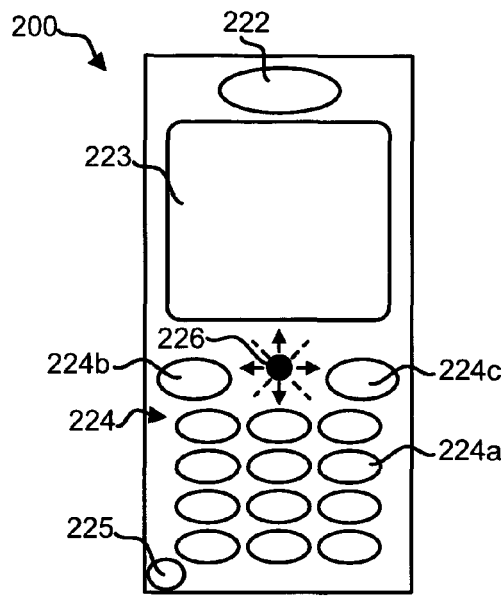
FIG. 2 is a schematic front view illustrating a mobile terminal according to an embodiment of the present invention.

An embodiment 200 of the mobile terminal 100 is illustrated in more detail in FIG. 2. The mobile terminal 200 comprises a speaker or earphone 222, a microphone 225, a display 223 and a set of keys 224 which may include a keypad 224a of common ITU-T type (alpha-numerical keypad representing characters "0"-"9", "*" and "#") and certain other keys such as soft keys 224b, 224c and navigational input device 226 such as a joystick or a joypad, where all input devices can also be called user input receivers.

Figure 3:
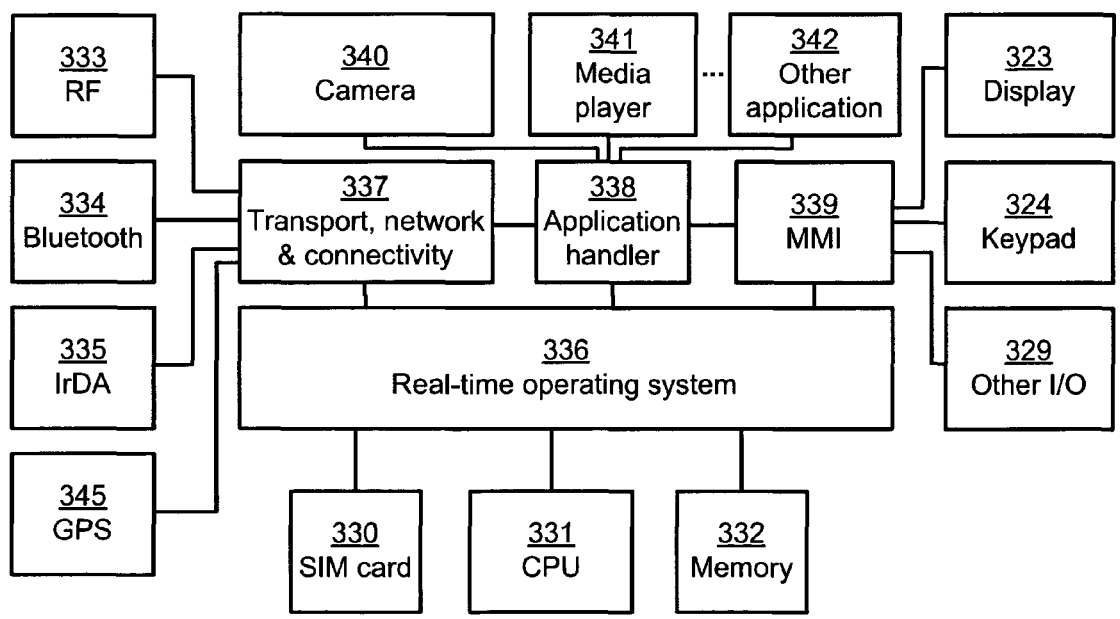
FIG. 3 is a schematic block diagram representing an internal component, software and protocol structure of the mobile terminal shown in FIG. 2.

The internal component, software and protocol structure of the mobile terminal 200 will now be described with reference to FIG. 3. The mobile terminal has a controller 331 which is responsible for the overall operation of the mobile terminal and is preferably implemented by any commercially available CPU ("Central Processing Unit"), DSP ("Digital Signal Processor") or any other electronic programmable logic device. The controller 331 has associated electronic memory 332 such as RAM memory, ROM memory, EEPROM memory, flash memory, hard drive, optical storage or any combination thereof. The memory 332 is used for various purposes by the controller 331, one of them being for storing data and program instructions for various software in the mobile terminal. The software includes a real-time operating system 336, drivers for a man-machine interface (MMI) 339, an application handler 338 as well as various applications. The applications can include a camera application 340, a media player application 341, as well as various other applications 342, such as applications for voice calling, video calling, web browsing, document reading and/or document editing, short message messaging, multimedia messaging, email messaging, an instant messaging application, a phone book application, a calendar application, a control panel application, one or more video games, a notepad application, etc.

The MMI 339 also includes one or more hardware controllers, which together with the MMI drivers cooperate with the display 323/223, keypad 324/224, as well as various other I/O devices 329 such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 337 and which provide communication services (such as transport, network and connectivity) for an RF interface 333, and optionally a Bluetooth interface 334 and/or an IrDA interface 335 for local connectivity. Optionally, an internal global positioning system (GPS) receiver 345 is provided. The RF interface 333 comprises an internal or external antenna as well as appropriate radio circuitry for establishing and maintaining a wireless link to a base station (e.g. the link 102 and base station 104 in FIG. 1). As is well known to a person skilled in the art, the radio circuitry comprises a series of analogue and digital electronic components, together forming a radio receiver and transmitter. These components include, i.a., band pass filters, amplifiers, mixers, local oscillators, low pass filters, AD/DA converters, etc.

The mobile terminal also has a SIM card 330 and an associated reader. As is commonly known, the SIM card 330 comprises a processor as well as local work and data memory.

Figure 4:
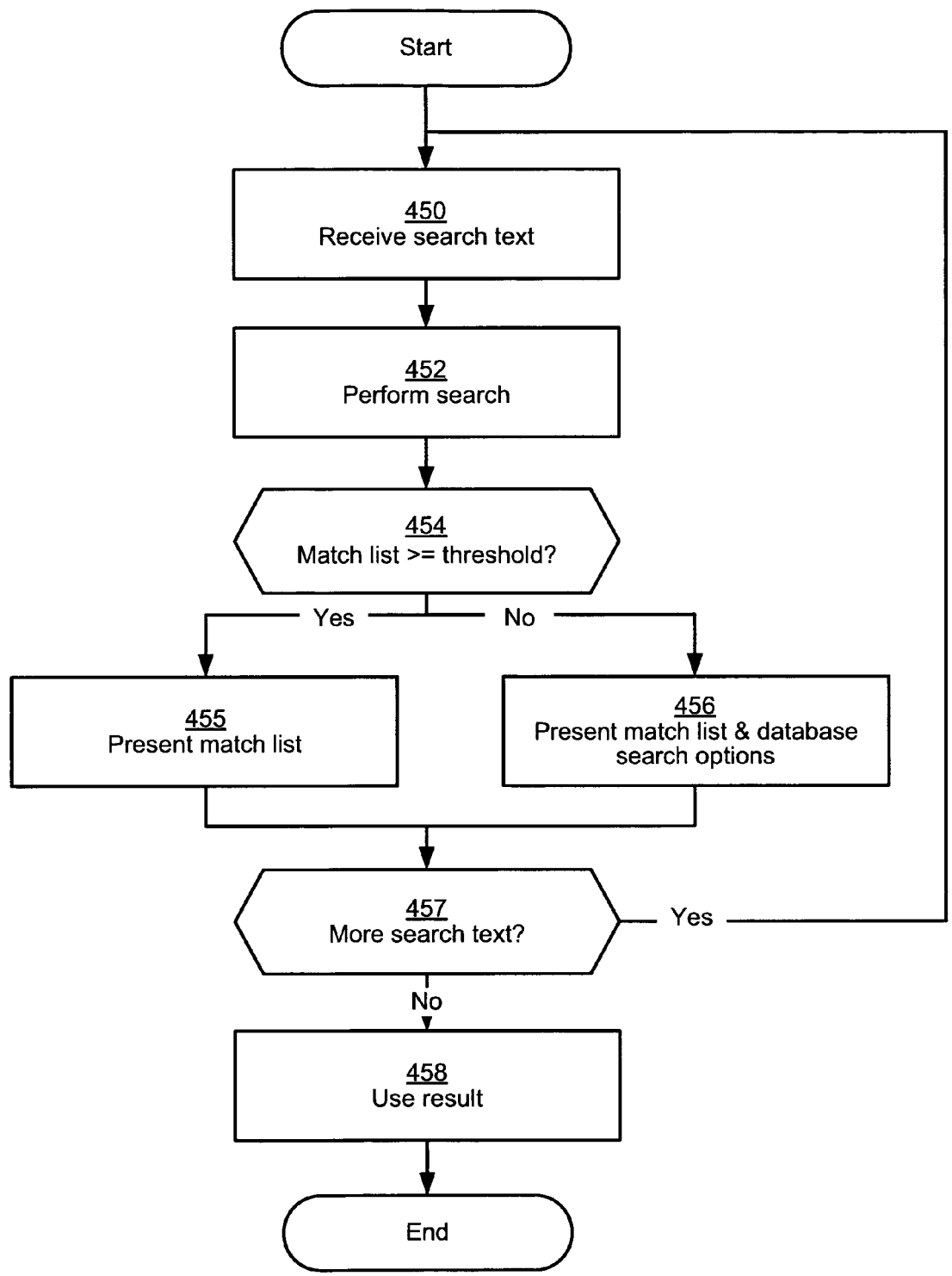
FIG. 4 is a flow chart illustrating a process for searching performed in the mobile terminal of FIG. 2.

FIG. 4 is a flow chart illustrating a process for searching performed in the mobile terminal of FIG. 2.

Any suitable content type can be searched, such as, but not limited to, images, songs, contacts, messages, chat histories, documents, visited web sites, bookmarks, etc. Optionally, the user can configure which content types to search and which content types to omit during search. The searched content items can be located in the mobile terminal or associated with the user and stored on equipment available to the mobile terminal through a network. For example, the search operation may search pictures/captions, documents, e-mails, etc associated with the user of the mobile terminal but stored on a server 115 available via the wide area network 112. The user typically first needs to configure username and passwords for each network resource to connect to.

In a first receive search text step 450, a search text is received from the user of the mobile terminal.

The actual search is performed in the perform search step 452. Optionally, the search is performed by means of a previously populated index, making response times low. A match list is produced with all the matches to the search text. If there are no matches, it can be considered as an empty match list.

In the conditional match list>=threshold step 454, it is tested whether the match list has more items than a threshold number of items. This threshold can optionally be user configurable. In one embodiment, the threshold is zero items. If the match list has more items than the threshold, the process continues to a present match list step 455, otherwise, the process continues to a present match list & database search options step 456.

In the present match list step 455, the match list is presented to the user on the display of the mobile terminal.

In the present match list & database search options step 456, the match list along with database search options, or items, are presented on the display. If the match list is empty, only the database search items are presented. The database search items provide the user with the ability to search using a remote server, e.g. server 115 of FIG. 1, using the search text. The search items can for example be a person database listing people and their contact details, a business database listing business and their contact details, a web search engine, etc. In one embodiment, the user can configure the database search items, adding, editing and removing entries as desired.

In a conditional more search text step 457, it is determined if the user enters more search text. If more text is entered, the process continues to the receive search text step 450, whereby the searching is performed again. On the other hand, if no more text is entered, the process continues to a use result step 458.

In the use result step 458, the user can invoke or use a desired item presented on the display. For example, the user can view a found picture, play a found song, read a found document, call a found contact, navigate to a found contact, etc.

FIGS. 5a-f are schematic display views illustrating one embodiment of the method of FIG. 4.

Figure 5A:
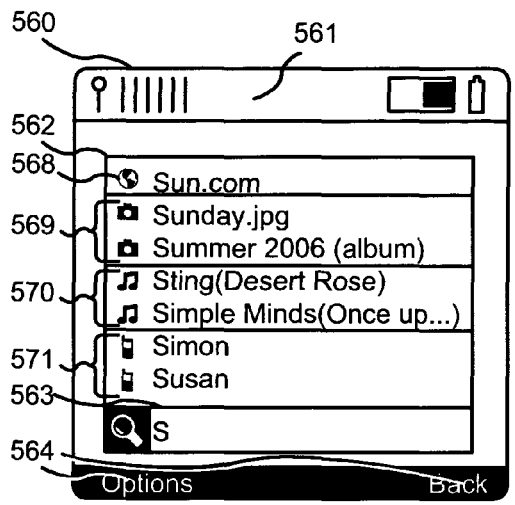
FIGS. 5a-f are schematic display views illustrating one embodiment of the method of FIG. 4.

The display views 560 are displayed on the display 223/323. In a top section 561, conventional status indicators are shown, e.g. for signal strength and battery level. As is conventional, in a bottom section 564, labels for soft keys 224b-c are shown. In FIG. 5a, the user has started to enter text in a search box 563 and the mobile terminal has performed a search. The user enters the text with any suitable text input mechanism, including predictive text input, e.g. T9, multi-tap, on-screen keyboard, handwriting recognition, etc. The result of the search is shown in a match list 562. As the user entered the text "S" in the search box 563, all items in the match list 562 begin with the letter "S". Optionally, the match list 562 can contain all items with at least one word beginning with the search text, in this case "S". The items in the match list are grouped together by content type. In the match list 562 the following content types are shown: a bookmark 568 to a web page, two images 569, two songs 570 and two contacts 571 from the phone book application. At any time, the user can select and activate any of the items of the match list 562, e.g. by using the navigational device 226, or the user can amend the search text.

Figure 5B:
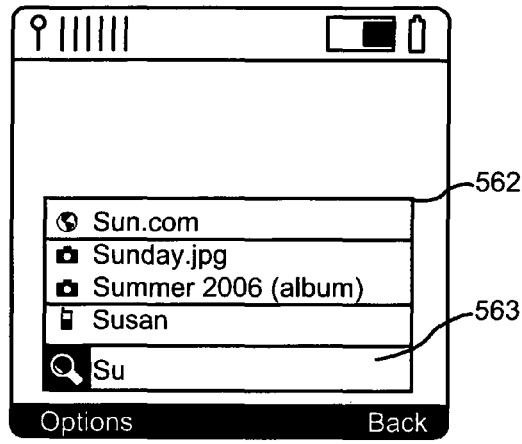

In FIG. 5b, the user has entered another letter, whereby the search text in the search box 563 reads "Su" and the match list 562 has been updated accordingly.

Figure 5C:
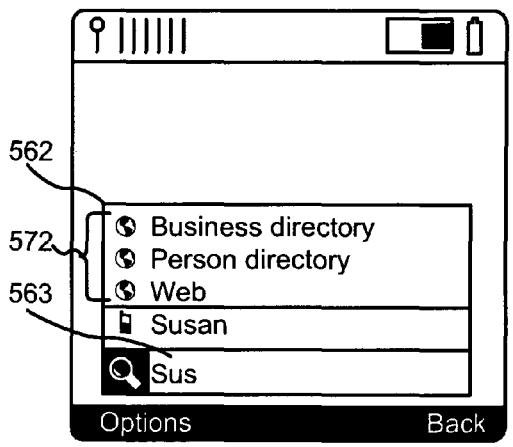

In FIG. 5c, the user has entered yet another letter, whereby the search text in the search box 563 reads "Sus" and the match list 562 is updated accordingly. Now the number of matches in the match list is only one. In this embodiment, if the number of matches in the match list is less than two, additional options, or search items, 572 to search online directories are presented. These items 572 allow the user to widen search scope when local hits are too few. This provides an easy and intuitive way to search, for example, person directories, business directories, the world wide web, etc. In other words, both local and online searches are initiated in the same way.

Figure 5D:
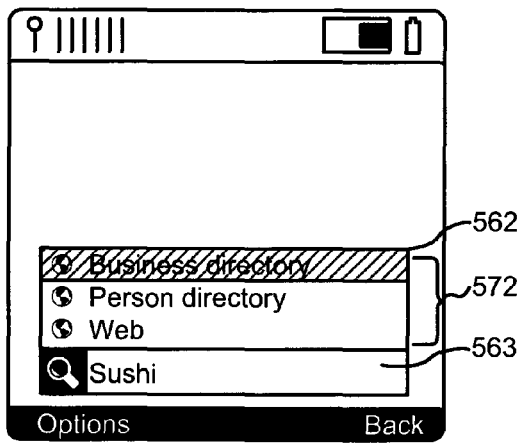

In FIG. 5d, the user has entered another two letters, whereby the search text in the search box 563 reads "Sushi". The match list 562 now only contains online search items 572 and no local matches. Here the first search item, a business directory search, is selected.

Figure 5E:
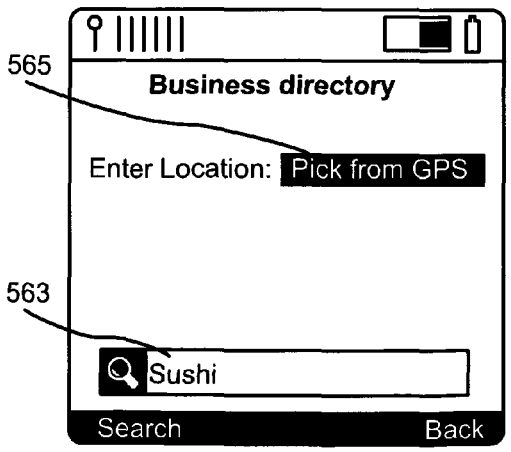

In FIG. 5e, the user has activated the business directory search. The search box 563 contains the same search text as previously, i.e. "Sushi". Moreover, location information 565 can be provided to the search engine for the business directory. Here, the internal or external global positioning system (GPS) receiver is used to provide the location information 565. Optionally, the user can enter location information 565 as text, specifying any combination of address, post code, city, country.

Figure 5F:
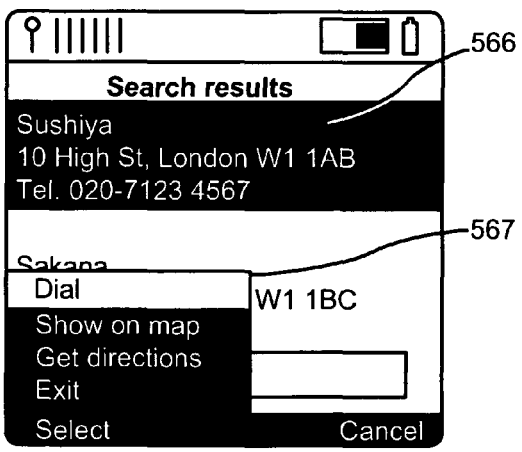

In FIG. 5f, the search by the business directory has been performed and the result is presented. The first match 566 of the business search is selected and the user has pressed the left soft key 224b to show an options menu 567. The options menu 567 allows the user to perform a number of actions with the selected match. For example, the phone number can be dialed, the location of the business in question can be shown on a map, or directions can be given from the current position of the mobile terminal to the location of the business in the first match (e.g. using the internal or external GPS receiver for location information).

Although the invention has above been described using an embodiment in a mobile terminal, the invention is applicable to any type portable apparatus, including portable mp3-players, cameras, pocket computers, portable gaming devices, etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method comprising:
   receiving, at a portable apparatus, text input as search text from a user of said portable apparatus;
   searching for content items of at least one content type matching said search text, resulting in a list containing zero or more matching content items;
   directing presentment of said list of matching content items on a display of said portable apparatus, when said list of matching content items contains at least a threshold number of content items;
   directing presentment of at least one option to search at least one of at least two databases available over a network using said search text on said display, when said list of matching content items comprises less than said threshold number of content items; and
   based on selection of the at least one option, searching the at least one of the at least two databases associated with the at least one option using search information in addition to said search text, wherein the search information is related to a type of data stored in the at least one of the at least two databases associated with the at least one option;
   wherein said receiving text input, searching for content items, directing presentment of said list and directing presentment of at least one option to search a database are repeated until either an item of said list of matching content items is selected or an option of said at least one option is selected.

2. The method of claim 1, wherein said searching comprises searching for content items using an index of content items, said index being stored in said portable apparatus.

3. The method of claim 1, wherein said searching for content items comprises searching for content items matching said search text from content items associated with said portable apparatus.

4. The method of claim 1, wherein said searching for content items comprises searching for content items matching said search text from content items associated with said user.

5. The method of claim 1, wherein said at least one content type comprises at least one of images, songs, contacts, messages, chat histories, documents, visited web sites, or bookmarks.

6. The method of claim 1, further comprising:
   providing, in response to user selection of one of said at least one option, location information of said portable apparatus as search criteria to a database associated with said selected option.

7. The method of claim 1, wherein said directing presentment of at least one option comprises directing presentment of at least one option to search a database, said option to search a database being selected from the group comprising an option to search a business directory, an option to search a person directory, an option to search the world wide web and an option to search a movie database.

8. An apparatus comprising at least one processor and at least one memory storing computer program code, wherein the at least one memory and stored computer program code are configured to, with the at least one processor, cause the apparatus to at least:
   receive text input as search text from a user of said apparatus;
   search for content items of at least one content type matching said search text, resulting in a list containing zero or more matching content items;
   direct presentment of said list of matching content items on a display operably connected to said apparatus, when said list of matching content items contains at least a threshold number of content items;
   directing presentment of at least one option to search at least one of at least two databases available over a network using said search text on said display, when said list of matching content items comprises less than said threshold number of content items; and
   based on selection of the at least one option, searching the at least one of the at least two databases associated with the at least one option using search information in addition to said search text, wherein the search information is related to a type of data stored in the at least one of the at least two databases associated with the at least one option;
   wherein the at least one memory and stored computer program code are configured to, with the at least one processor, cause the apparatus to repeat said receiving text input, searching for content items, directing presentment of said list and directing presentment of at least one option to search a database until either an item of said list of matching content items is selected or an option of said at least one option is selected.

9. The apparatus of claim 8, wherein the at least one memory and stored computer program code are configured to, with the at least one processor, cause the apparatus to search by searching for content items using an index of content items, said index being stored in memory of the apparatus.

10. The apparatus of claim 8, wherein the at least one memory and stored computer program code are configured to, with the at least one processor, cause the apparatus to search for content items by searching for content items matching said search text from content items associated with said apparatus.

11. The apparatus of claim 8, wherein the at least one memory and stored computer program code are configured to, with the at least one processor, cause the apparatus to search for content items by searching for content items matching said search text from content items associated with said user.

12. The apparatus of claim 8, wherein said at least one content type comprises at least one of images, songs, contacts, messages, chat histories, documents, visited web sites, or bookmarks.

13. The apparatus of claim 8, wherein the apparatus comprises a portable apparatus, and wherein the at least one memory and stored computer program code are configured to, with the at least one processor, further cause the apparatus to:

provide, in response to user selection of one of said at least one option, location information of said apparatus as search criteria to a database associated with said selected option.

14. The apparatus of claim 8, wherein the at least one memory and stored computer program code are configured to, with the at least one processor, cause the apparatus to direct presentment of at least one option by directing presentment of at least one option to search a database, said option to search a database being selected from the group comprising an option to search a business directory, an option to search a person directory, an option to search the world wide web and an option to search a movie database.

15. A computer program product comprising at least one non-transitory computer-readable storage medium having computer-readable program instructions stored therein, the computer-readable program instructions comprising:

program instructions configured for directing receipt of text input as search text from a user;

program instructions configured for searching for content items of at least one content type matching said search text, resulting in a list containing zero or more matching content items;

program instructions configured for directing presentment of said list of matching content items on a display when said list of matching content items contains at least a threshold number of content items;

program instructions configured for directing presentment of at least one option to search at least one of at least two databases available over a network using said search text on said display, when said list of matching content items comprises less than said threshold number of content items; and program instructions configured for, based on selection of the at least one option, searching the at least one of the at least two databases associated with the at least one option using search information in addition to said search text, wherein the search information is related to a type of data stored in the at least one of the at least two databases associated with the at least one option;

wherein the at least one memory and stored computer program code are configured to, with the at least one processor, cause the apparatus to repeat said receiving text input, searching for content items, directing presentment of said list and directing presentment of at least one option to search a database until either an item of said list of matching content items is selected or an option of said at least one option is selected.

16. The computer program product of claim 15, wherein said program instructions configured for searching comprise program instructions configured for searching for content items using an index of content items.

17. The computer program product of claim 15, further comprising:

program instructions configured for providing, in response to user selection of one of said at least one option, location information as search criteria to a database associated with said selected option.

18. The computer program product of claim 15, wherein said program instructions configured for directing presentment of at least one option comprise program instructions configured for directing presentment of at least one option to search a database, said option to search a database being selected from the group comprising an option to search a business directory, an option to search a person directory, an option to search the world wide web and an option to search a movie database.

* * * * *